United States Patent
Demin et al.

(10) Patent No.: US 12,255,448 B2
(45) Date of Patent: Mar. 18, 2025

(54) INTRINSICALLY SAFE MULTI-DROP COMMUNICATION HUB

(71) Applicant: Franklin Fueling Systems, LLC, Madison, WI (US)

(72) Inventors: Vitaliy Demin, Saco, ME (US); Timothy Dyson, South Berwick, ME (US); John J. Gillis, Sebago, ME (US); Alexander Lapayev, Portland, ME (US)

(73) Assignee: Franklin Fueling Systems, LLC, Madison, WI (US)

( * ) Notice: Subject to any disclaimer, the term of this patent is extended or adjusted under 35 U.S.C. 154(b) by 114 days.

(21) Appl. No.: 17/906,649

(22) PCT Filed: Mar. 18, 2021

(86) PCT No.: PCT/US2021/022987
§ 371 (c)(1),
(2) Date: Sep. 19, 2022

(87) PCT Pub. No.: WO2021/188808
PCT Pub. Date: Sep. 23, 2021

(65) Prior Publication Data
US 2023/0145314 A1      May 11, 2023

Related U.S. Application Data

(60) Provisional application No. 62/991,626, filed on Mar. 19, 2020.

(51) Int. Cl.
*H02H 9/00* (2006.01)
*G05B 9/02* (2006.01)
*G05B 19/042* (2006.01)

(52) U.S. Cl.
CPC ............... *H02H 9/008* (2013.01); *G05B 9/02* (2013.01); *G05B 19/0425* (2013.01)

(58) Field of Classification Search
CPC ....... G05B 9/02; G05B 19/0425; H02H 9/008
(Continued)

(56) References Cited

U.S. PATENT DOCUMENTS 4,161,782 A * 7/1979 McCracken ............. G01D 9/16
                                                                  700/74
9,908,470 B1 * 3/2018 Englander ............... B60K 35/00
(Continued)

FOREIGN PATENT DOCUMENTS

WO    WO-2004094892 A2 * 11/2004  ............ F15B 21/04
WO    WO-2019235261 A1 * 12/2019  ......... H01F 17/0013

OTHER PUBLICATIONS

Machine translation of Satoshi International Patent Document WO 2019235261 A1 Dec. 2019 (Year: 2019).*

*Primary Examiner* — Kevin J Comber
(74) *Attorney, Agent, or Firm* — Faegre Drinker Biddle & Reath LLP

(57) ABSTRACT

An intrinsically safe (IS) multi-drop communication hub operable in a hazardous environment, including a power contact; a controller and a first signal input contact; a multiplexer communicatively connected to the controller; and a communication port communicatively connected to the controller to transmit the signal data provided by the multiplexer, wherein when the controller causes the multiplexer to supply power in a predetermined sequence to a first of the IS devices during a first time interval to generate a signal from the first of the IS devices and, after the first time interval, to a second of the IS devices during a second time (Continued)

interval, which does not overlap in time with the first time interval, to generate a signal from the second of the IS devices.

29 Claims, 16 Drawing Sheets

(58) Field of Classification Search
USPC .......................................................... 361/58
See application file for complete search history.

(56) References Cited

U.S. PATENT DOCUMENTS

2002/0080545 A1* 6/2002 Slater .................... H02H 9/042
361/106
2002/0090001 A1* 7/2002 Beckwith ............. H04W 84/18
340/870.14

* cited by examiner

INTRINSICALLY SAFE MULTI-DROP COMMUNICATION HUB

CROSS-REFERENCE TO RELATED APPLICATIONS

This application is a 371 U.S. National Phase Application of International PCT Application No. PCT/US2021/022987, filed Mar. 18, 2021, which claims priority from and the benefit of U.S. patent application Ser. No. 62/991,626, filed Mar. 19, 2020, the entire disclosures of which are incorporated herein.

TECHNICAL FIELD

The disclosure relates to an apparatus to establish communications with multiple intrinsically safe devices via a communications port communicatively coupled to a single intrinsically safe barrier.

BACKGROUND OF THE DISCLOSURE

Hazards can occur during pumping of hazardous liquids, including mechanical seal failures resulting in leaks or fugitive emissions, deadheading, reduced or low flow in centrifugal pumps, over-pressurization, and high temperature. The hazards can result in severe incidents including fires, explosions and toxic releases. Safety measures are required by regulations to prevent the hazards and protect the pumping environment. Generally, safety measures include explosion-proofing or use of intrinsically safe designs. Intrinsically safe (IS) equipment is equipment which is incapable of releasing sufficient electrical or thermal energy to cause ignition of a specific hazardous atmospheric mixture in its most easily ignited concentration. Intrinsically safe designs often encompass control systems that use processors to monitor sensor signals from sensors including, for example, temperature, pressure, flow, speed, vibration, oxygen, etc. These control systems are subject to electrical limits to ensure they do not release electrical or thermal energy above limits based on the fluid being handled.

As technologies advance it may be desirable to provide additional sensors and/or controls to improve monitoring. Additional signals may provide faster detection or detection of previously unmeasurable parameters. The desirability of additional sensors may be tempered by installation costs. Particularly in existing environments, where cables may be buried under concrete, the addition of sensor cables may be prohibitively expensive.

Based on the foregoing it is evident that a need exists for the capability to add sensors in a hazardous environment without exceeding regulated limits and at an affordable cost.

SUMMARY

An intrinsically safe (IS) multi-drop communication hub (IS hub), a method to obtain signals from IS devices, and a method of mounting and connecting the IS hub are provided. The IS hub includes a multiplexer and a controller to control the multiplexer and sample signals from the IS devices in accord with a sequence of commands from the controller to the multiplexer. Responsive to the commands, the multiplexers powers the IS devices according to the sequence and the controller samples the signals of the powered IS device.

The IS hub can be mounted on a bracket in a first position and a second position. In the second position an opening of the IS hub is more easily accessible than in the first position and the cables and other components can be connected to the IS hub. The IS hub is then mounted in the first position where the opening is less or not accessible.

In some embodiments of the intrinsically safe (IS) multi-drop communication hub (IS hub) operable in a hazardous environment, the IS hub includes a power contact to receive external power therethrough; a controller including multiplexing sequence logic and a first signal input contact; a multiplexer communicatively connected to the controller and having a power input contact; an inductor connected in series between the power contact and the power input contact of the multiplexer; a communication port communicatively connected to the controller to receive signal data therefrom, the signal data corresponding to signals generated by IS devices connected to the IS hub when the IS hub is in use, wherein when executed by the controller the multiplexing sequence logic causes the multiplexer to supply power in a predetermined sequence to a first of the IS devices during a first time interval and, after the first time interval, to a second of the IS devices during a second time interval which does not overlap in time with the first time interval, and wherein during the first time interval the controller samples a signal corresponding to the first of the IS devices and during the second time interval the controller samples a signal corresponding to the second of the IS devices.

In some embodiments of a mounting bracket operable with the IS hubs described herein, the IS hub has a housing having a body and a cover covering an access opening of the body. The mounting bracket can support the IS hub in a first position and in a second position. In the second position the access opening faces upward and in the first position the access opening does not face upward. This allows an installer person to connect wires to the IS hub in the second position and to then place the IS hub in the first position for normal operation.

In some variations, the mounting bracket has a hinge operable to move the IS hub from the first position to the second position. In other variations, the mounting bracket has first and second mounting features and the IS hub has mounting features operable with the first and second mounting features of the bracket, so that the IS hub can be mounted in the first position with the first mounting features and the second position with the second mounting features. The mounting features can comprise rails sized and shaped to slide within corresponding slots. The mounting bracket or the body can include the rails or the slots.

BRIEF DESCRIPTION OF THE DRAWINGS

The above-mentioned embodiments and additional variations, features and advantages thereof will be further elucidated by the following illustrative and nonlimiting detailed description of embodiments disclosed herein with reference to the appended drawings, wherein.

In the drawings, corresponding reference characters indicate corresponding parts, functions, and features throughout the several views. The drawings are not necessarily to scale and certain features may be exaggerated in order to better illustrate and explain the disclosed embodiments.

DETAILED DESCRIPTION

Figure 1:
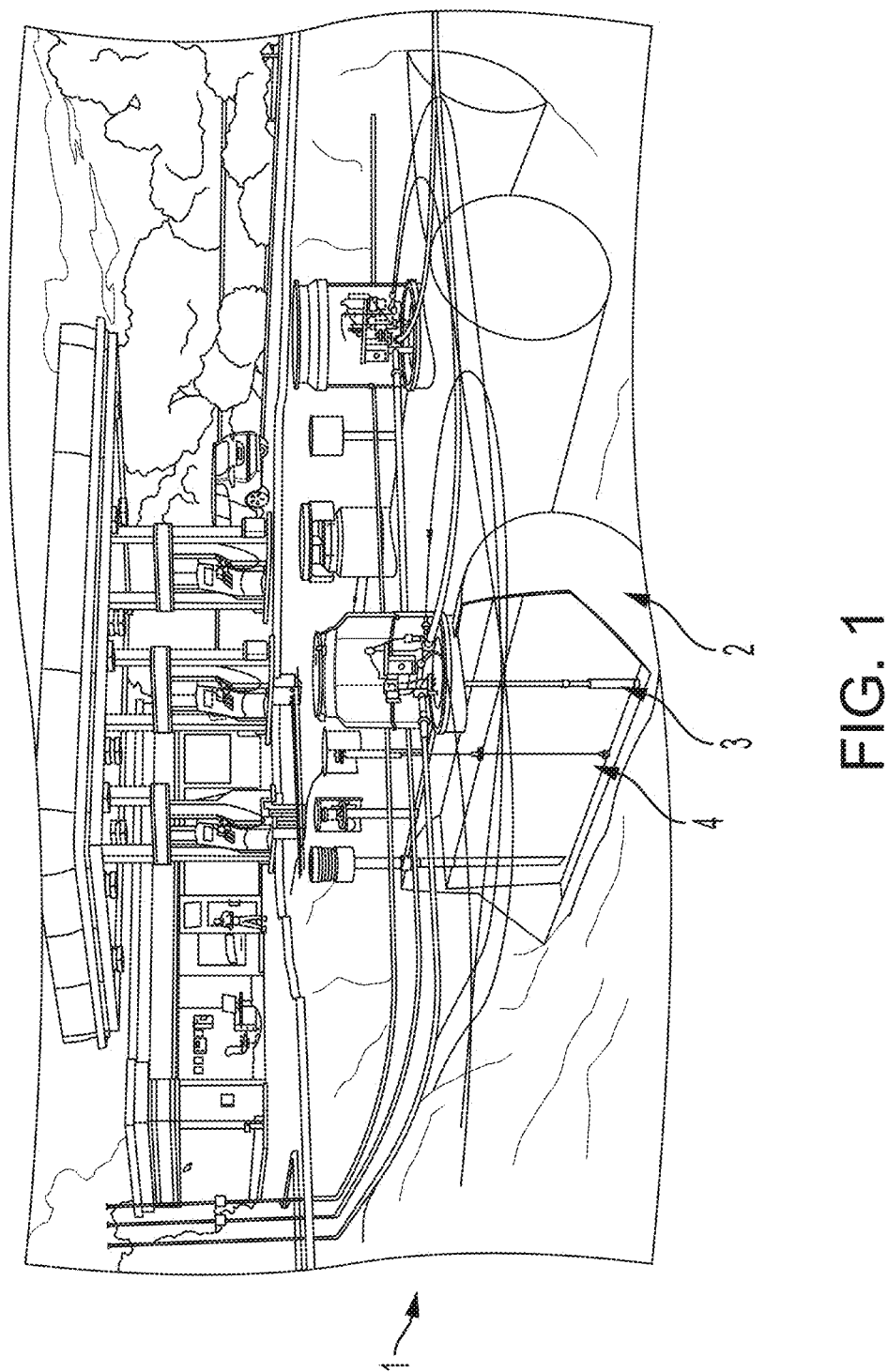
FIG. 1 is a perspective view of a fuel dispensing installation.

For the purposes of promoting an understanding of the principles of the disclosure, reference will now be made to the embodiments illustrated in the drawings, which are described below. The embodiments disclosed below are not intended to be exhaustive or limit the disclosure to the precise form disclosed in the following detailed description.

IS equipment must have been tested and approved by an independent agency to assure its safety and can be approved either under the system or entity approval concept. The system concept specifies parts that can be used in the system. The entity concept is more general, it specifies parameters of IS equipment and barriers. IS equipment is located in the hazardous environment, IS barriers are located in non-hazardous areas. Signals have to pass through an IS barrier to connect IS equipment to control equipment that must be located in the non-hazardous, or safe, area. The entity concept specifies, for example, that the maximum allowable voltage of apparatus in the hazardous area, $V_i$ must be higher than maximum voltage, $V_O$, produced by the IS barrier. The entity concept also defines limits for current, capacitance, inductance etc., which allows to mix and match IS barriers and is devices based on certain rules.

FIG. 1 is a perspective view of a fuel dispensing installation 1 including fuel tanks 2, fuel pumps 3, and fuel level gages 4. As shown, the fuel tanks are underground and sensors and wiring connections are in an underground sump pump housing.

Figure 3:
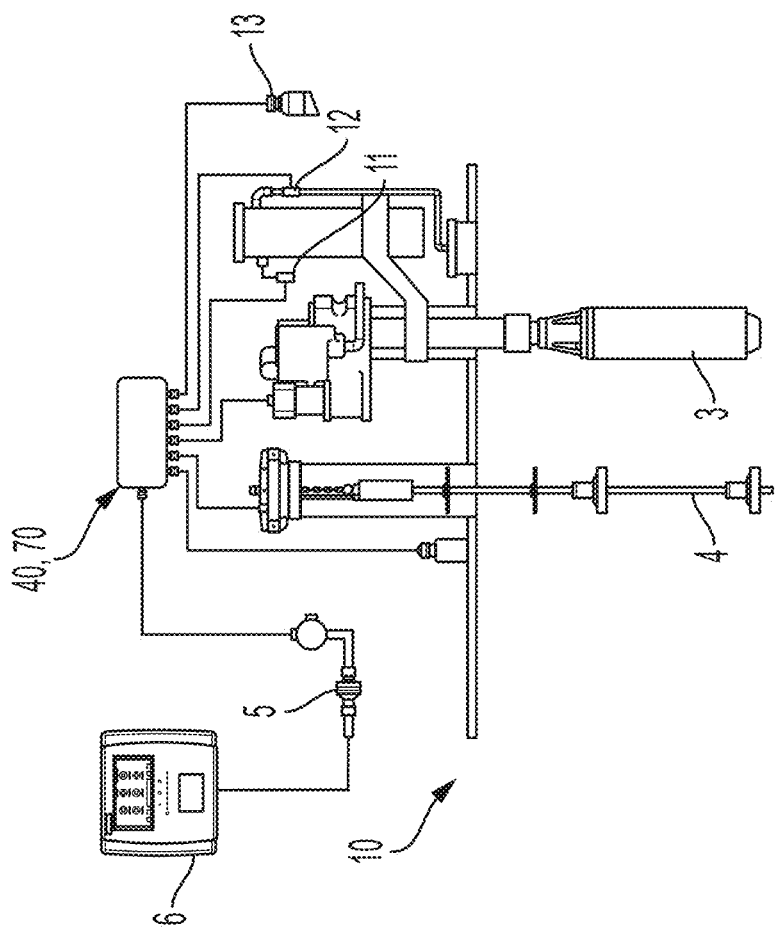
FIGS. 2 and 3 are schematic representations of an installation with and without an IS multi-drop communication hub.
Figure 2:
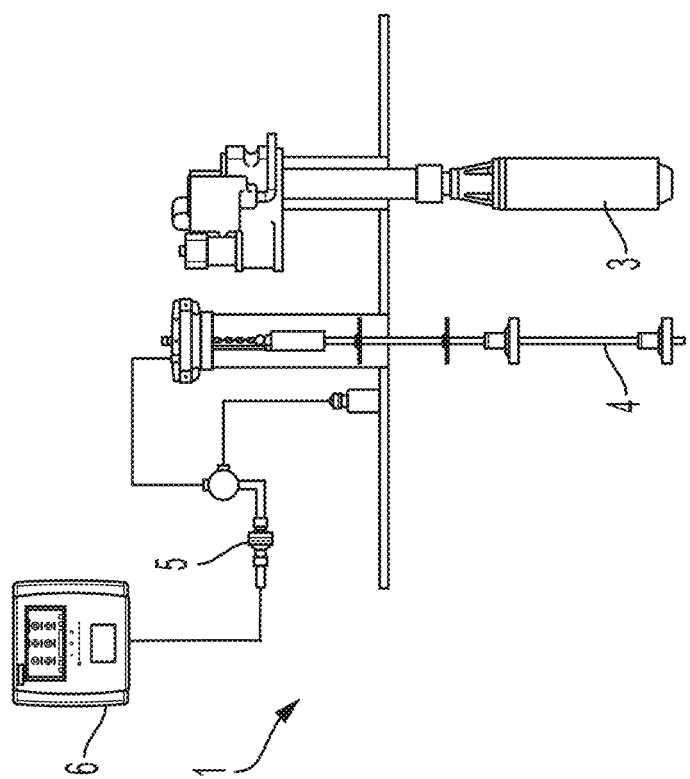

FIGS. 2 and 3 are schematic representations of the installation of FIG. 1 with and without an IS multi-drop communication hub. FIG. 2 illustrates a junction box 5, located in a sump housing, and a fuel dispenser controller 6 that receives sensor signals from the installation and transmits control signals to operate the fuel pumps. FIG. 3 illustrates the installation of FIG. 2 with the addition of IS hubs 40, 70 in the sump housing and, as described below, operable to receive and transmit data from sensors 11, 12, and 13, which could be, for example, a water sensor, a flow switch, a corrosion sensor, or any other sensor.

Figure 4:
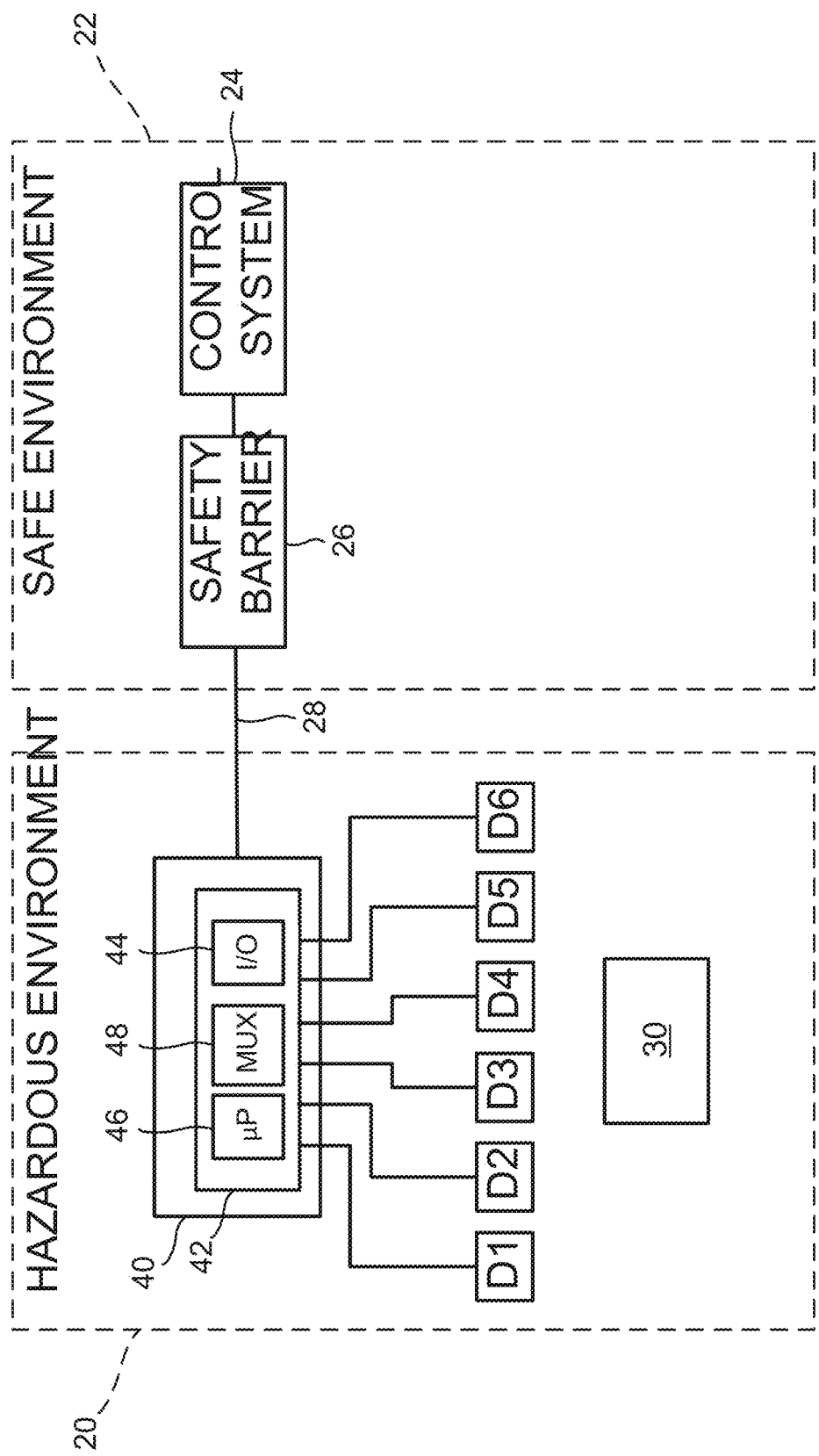
FIG. 4 is a schematic representation of an embodiment of an IS multi-drop communication hub.

FIG. 4 is a schematic representation of an embodiment of an apparatus operable to establish communications with multiple intrinsically safe devices in a hazardous environment via a communications port communicatively coupled to a single intrinsically safe barrier. FIG. 4 shows a hazardous environment 20, a safe environment 22, and in safe environment 22 a control system 24, an IS barrier 26, and a cable 28 extending from IS barrier 26 into hazardous environment 20.

Figure 19:
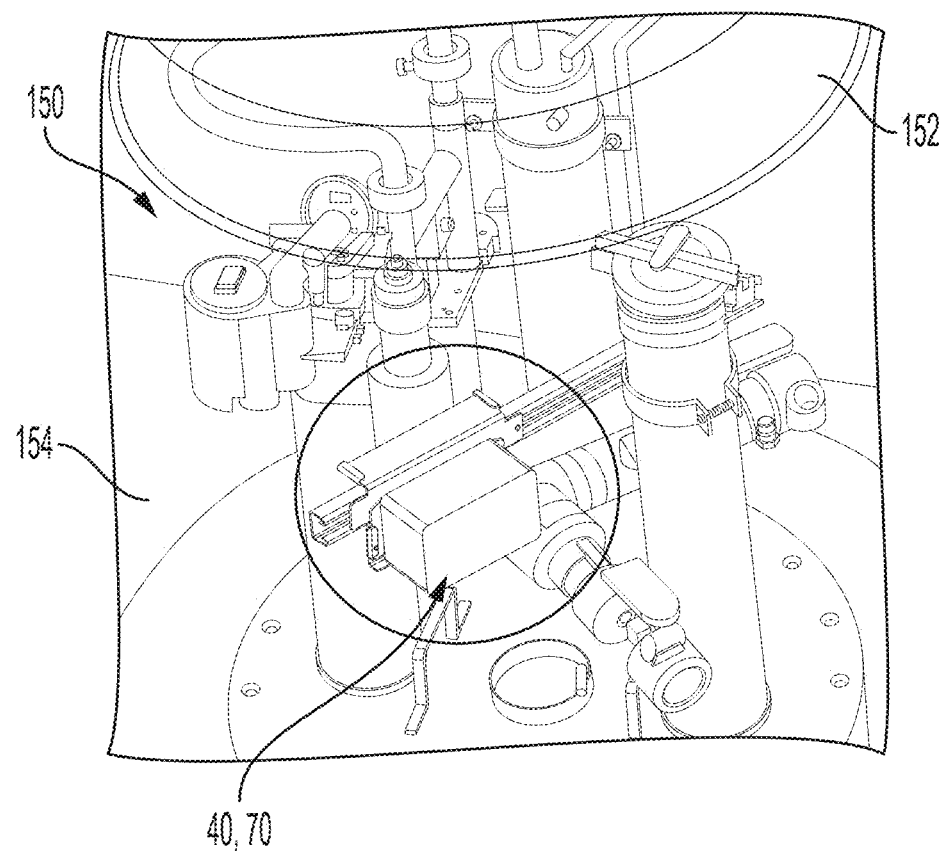
FIGS. 19 and 20 are perspective views of examples of embodiments illustrating mounting of the IS hub.

In hazardous environment 20 there is an IS device 30, an IS multi-drop communication hub 40 (also shown in FIGS. 6 and 7), and six IS devices depicted as D1-D6, which may be IS sensors operable to sense characteristics of IS device 30. In one example, IS device 30 is a sump pump and the IS sensors sense various parameters related to the operation of the sump pump such current, temperature, vibration, and others. IS devices D1-D6 can also be control devices such as actuators. Each IS device D1-D6 may comprise a pair of wires connected to IS multi-drop communication hub 40, such as a signal wire and a ground wire. Thermocouples, for example, generate an output voltage based on temperature and therefore comprise two wires. Flow and pressure sensors, control devices, and other IS devices connected to IS multi-drop communication hub 40 may comprise power, ground and signal wires or may have just two wires that carry power and communications at the same time. Hazardous environment 20 may be an enclosable space 150 having a lateral wall 152 and a bottom wall 154 (FIG. 19) sized and shaped to enclose the aforementioned components while providing access to them for repair and maintenance, for example.

IS multi-drop communication hub 40 (and IS hub 70) comprises a housing 60 (shown in FIGS. 6 and 7), and inside the housing a circuit board 42, a shield 66 (shown in FIGS. 6 and 7) in front of circuit board 42, and terminals connected to circuit board 42 and the wires from IS devices D1-D6. Housing 60 has a body 62 including an opening 63 covered by a cover 64 provided to form an enclosed space. The enclosed space may be sealed by inclusion of gaskets or other fitments (e.g. precision contouring, sizing and shaping of matching surfaces) between the cover and the housing. The seal may be liquid-tight or fluid-tight.

Mounted on circuit board 42 are a communication port 44 communicatively connected to cable 28, a controller 46, and a multiplexer 48. Multiplexer 48 may be a power multiplexer or a control multiplexer, or a combination of both. A power multiplexer time-shares power to one of many power wires of IS devices D1-D6. A control multiplexer time-shares a control signal to one of many control wires of IS devices D1-D6. Thusly, the multiplexer activates one device at the time, either by providing power to one device at the time or by controlling the devices such that only one is active at the time. The other devices may be in an inactive or sleep mode. The power multiplexer can also multiplex signals superimposed on the power conductor.

Controller 46 includes logic to command the multiplexer to activate the devices. Because the amount of power sourced by IS barrier 26 is limited and the time-base (sampling frequency) of the parameters being sensed may differ, controller 46 must select the operating order of the devices to maximize utility. For example, it may not be necessary to measure temperature as frequently as pressure, because pressure can change instantly while thermocouples do not react instantly to temperature changes. Thus, pressure can be sampled more frequently and temperature can be sampled less frequently. Similarly, an actuator might not need to be operated on a regular basis, it may be turned on or off and left in that state for a period of time. Controller 46 may be a microcontroller, FPGA, system-on-a-chip (SoC) integrated circuit, or any known circuit capable of executing logic instructions.

Figure 5:
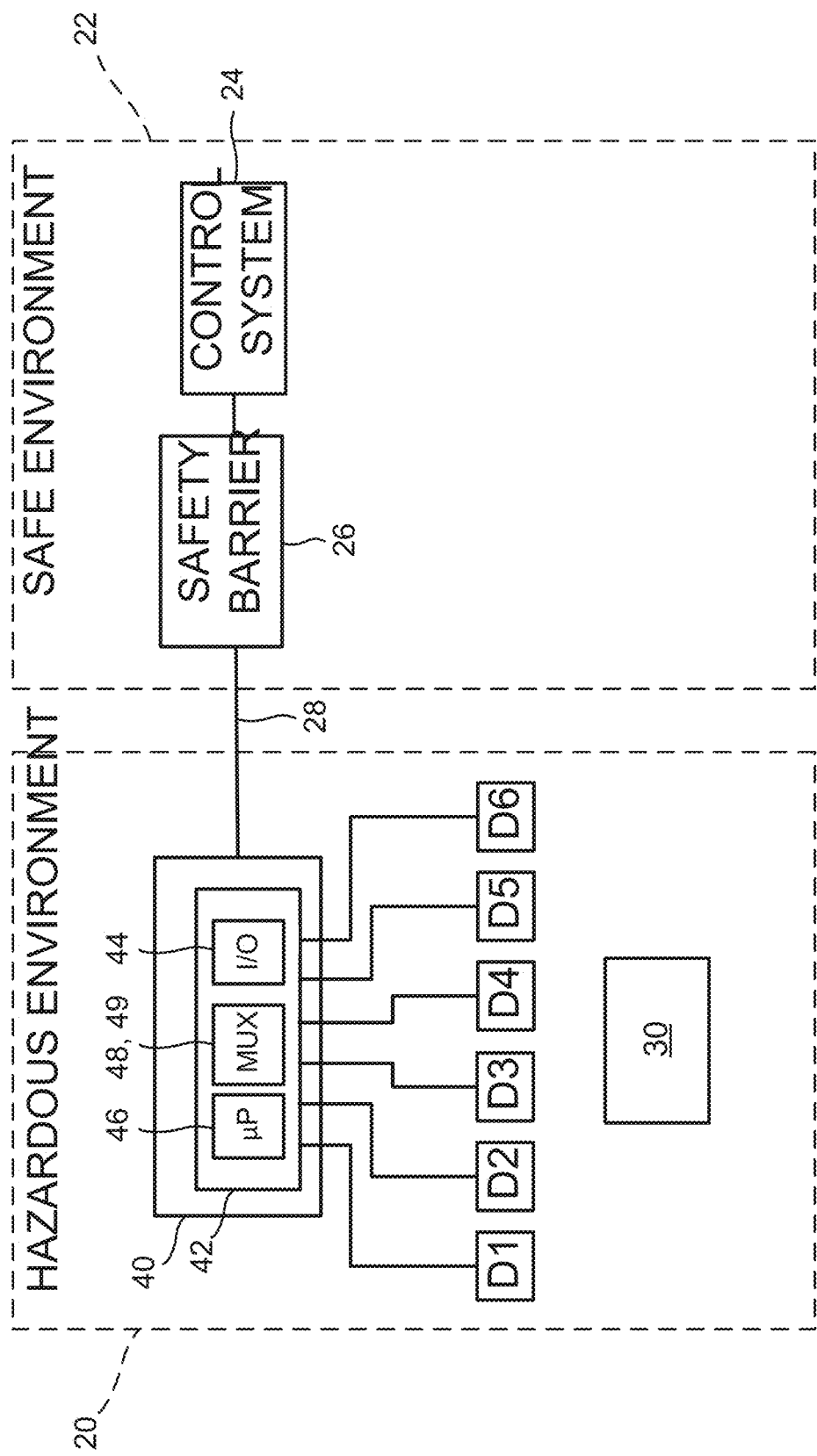
FIG. 5 is a schematic representation of a variation of the embodiment of the hub of FIG. 4.

FIG. 5 is a schematic representation of a variation of IS multi-drop communication hub 40 to illustrate the presence of two multiplexers, 48 and 49. The multiplexers can be power multiplexers, control multiplexers, or a combination of power and control multiplexers. The presence of two multiplexers may be useful in situations where two IS devices may be activated simultaneously without exceeding the IS barrier characteristics limits. Appropriate circuitry, such as diodes and other known circuit elements, may be used to enable connection of power or control wires from both multiplexers to a single IS device, for example to prevent current leakage. Of course, if two devices may be activated, it may also be possible to structure IS multi-drop communication hub 40 to have a dedicated IS device connection and one multiplexer.

Controller 46 is able to digitize analog inputs and to sample the digital data, and to transmit the digital data via communication port 44. The controller may incorporate a communication port. The controller can have many analog inputs (16 is not unusual). In the present example communications from the multiplexer to the controller occur over a line supplying power to the multiplexer, therefore communications are multiplexed with power. Additional inputs of the controller can be used for sensors that do not require provision of power.

In one example, the controller has one input dedicated for a device which is always powered (channel 0), one input for four multiplexed devices (channel 1-4), and one input for a temperature sensor (channel 5). The configuration is flexible, meaning that more or fewer devices can be connected to the controller without passing through the multiplexer, depending on the electrical characteristics of the IS devices and installation factors such as cable length.

In one variation of the present embodiment, the maximum current permissibly drawn by the IS hub is $I_{MAX}$ and the controller is structured to maintain current at or below $I_{MAX}$. In one example $I_{MAX}$=100 mA at 9 volts. The current consumption of the IS hub includes current consumed by the IS hub plus current consumed by the IS devices suppled power by the IS hub. A current limiter may be included to ensure current does not exceed $I_{MAX}$. Example current limiters are described with reference to FIGS. 17 and 18.

Communication port 44 may comprise a terminal to connect cable 28 and a communication integrated circuit including a communication protocol such as, for example the Modbus protocol. The terminal connection is suited to any desired communication scheme, for example serial or parallel schemes. A preferred communication scheme is the half-duplex RS-485 standard, which is a two-wire differential bi-directional communication scheme. Data may be transmitted in sequence together with a node address corresponding to the respective sensor. Data may also be incoming, for example to control actuators, in which case the address indicates which actuator is to be activated.

Figure 6:
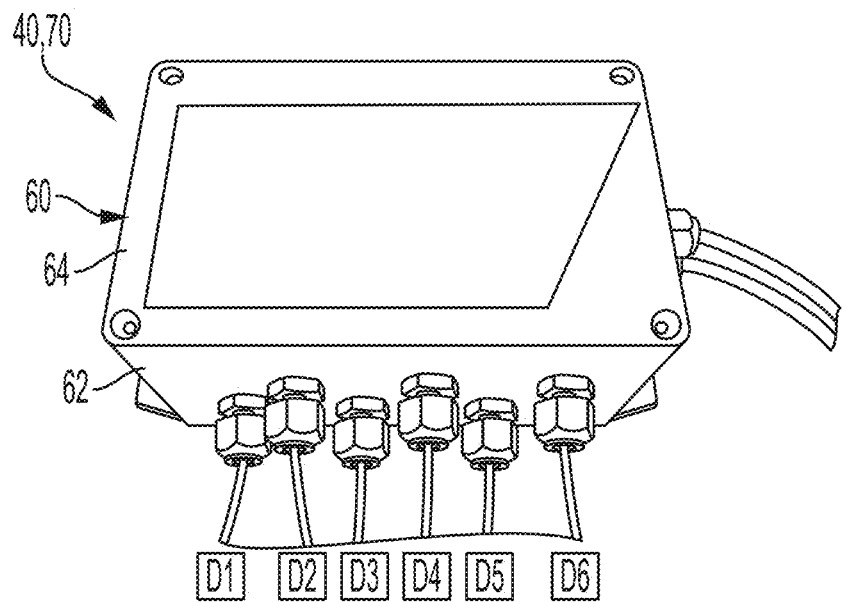
FIGS. 6 and 7 are perspective views of the embodiment of a housing operable to contain any one of the embodiments and variations of the circuits of the IS multi-drop communication hub.
Figure 7:
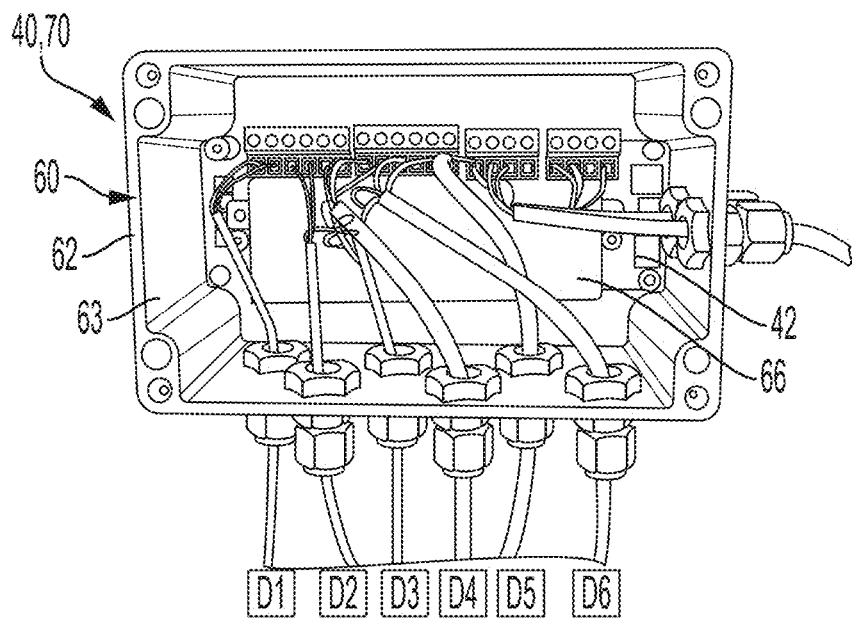
Figure 8:
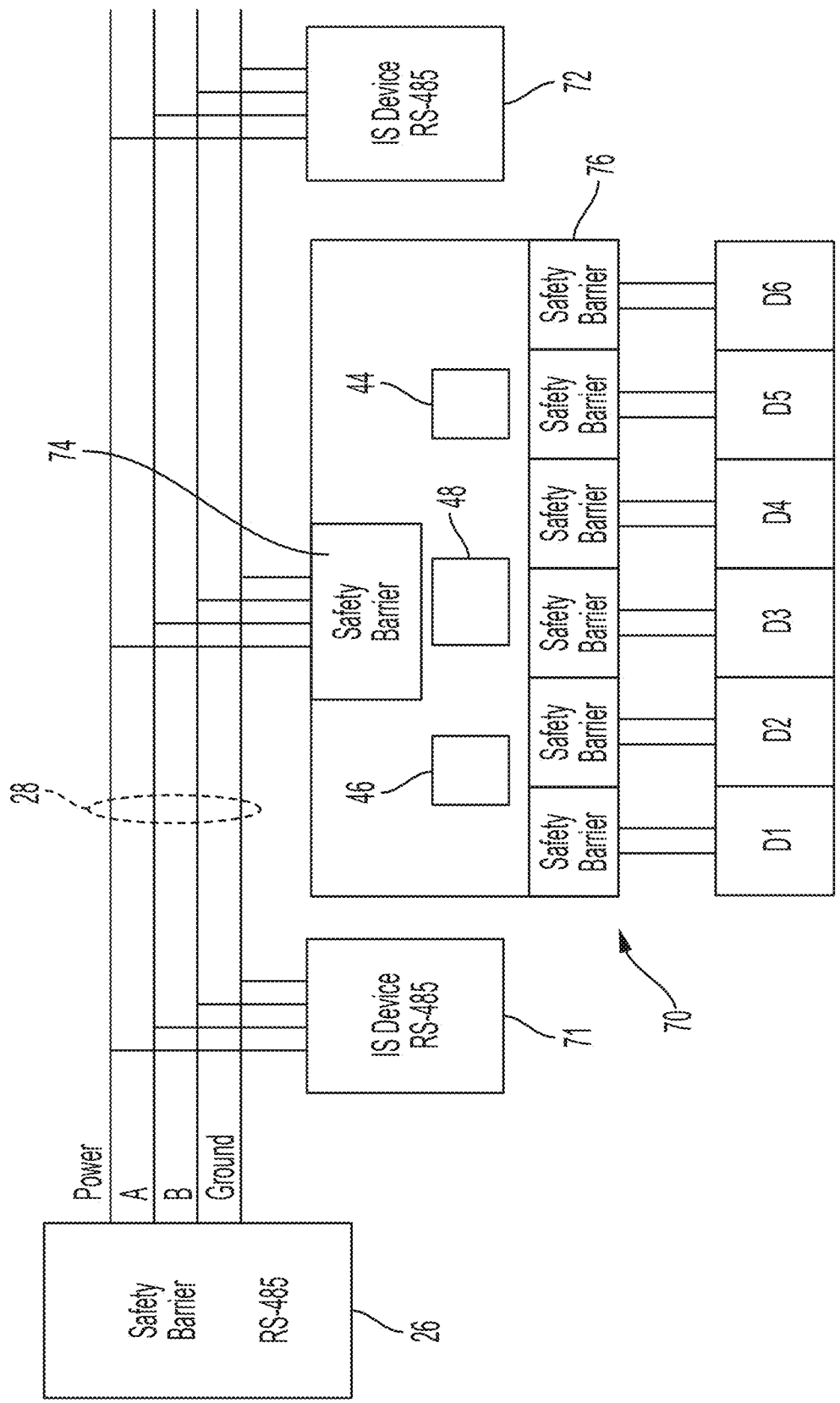
FIG. 8 is a schematic diagram of a variation of the embodiment of the hub depicted in FIG. 4.

FIGS. 6 and 7 are perspective views of the embodiment of the hub depicted in schematic form in FIGS. 1, 5 and 8. IS multi-drop communication hub 40, 70 comprises a housing 60, and inside the housing circuit board 42, shield 66 in front of circuit board 42, terminals connected to circuit board 42, and the wires from IS devices D1-D6 extending to the IS barrier. Housing 60 comprises a body and a cover. The cover is removed to connect the IS device wires.

Figure 9:
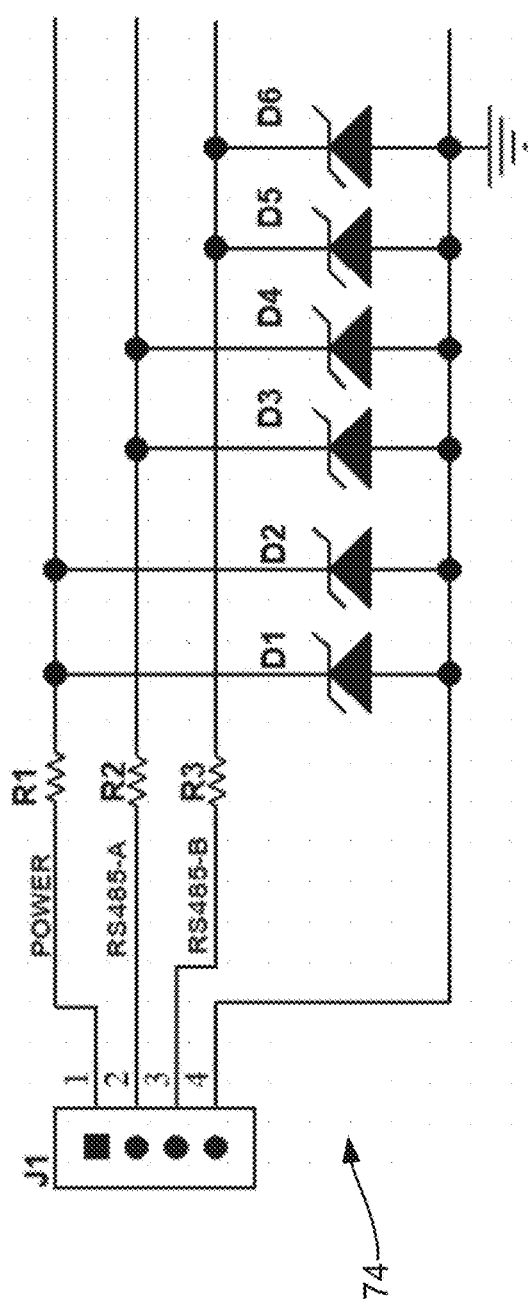
FIGS. 9 and 10 are circuit diagrams of portions of the hub depicted in FIG. 8.
Figure 10:
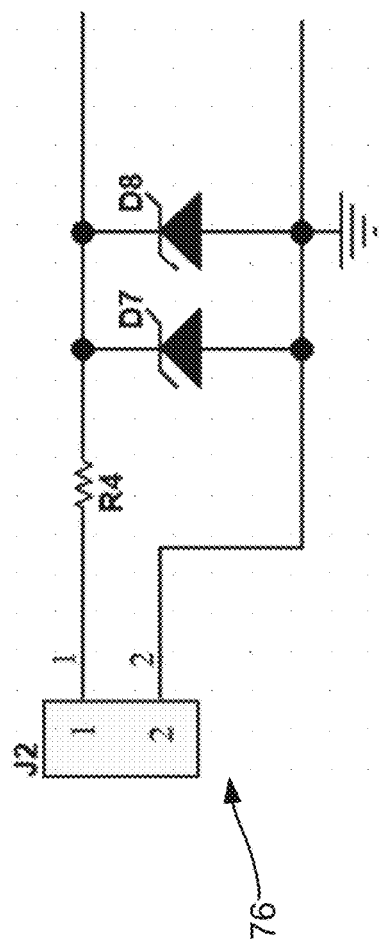

FIG. 8 is a schematic representation of a variation of IS multi-drop communication hub 40, denoted by numeral 70. As shown, IS hub 70 includes a safety barrier 74 between cable 28 and devices in IS hub 40 and electrical safety barriers 76 between multiplexer 48 and IS devices D1-D6 connected to IS hub 40. Exemplary electrical safety barriers are shown in FIGS. 9 and 10. The exemplary safety barriers comprise Zener diodes and resistors configured to place limits on the voltages incoming on the power line from the communication cable and/or on the power supplied to the IS devices. The safety barriers can take any form know to limit voltage and/or capacitance and/or inductance. The safety barriers can be included with any of the IS multi-drop communication hub embodiments depicted herein and may be based on the number and type of IS devices included in the hub.

As indicated above, controller 46 is able to digitize analog inputs, sample the digital data, and to transmit the digital data via communication port 44. The controller can have many analog inputs (16 is not unusual). Additional inputs of the controller can be used for sensors that do not require provision of power.

Figure 11A:
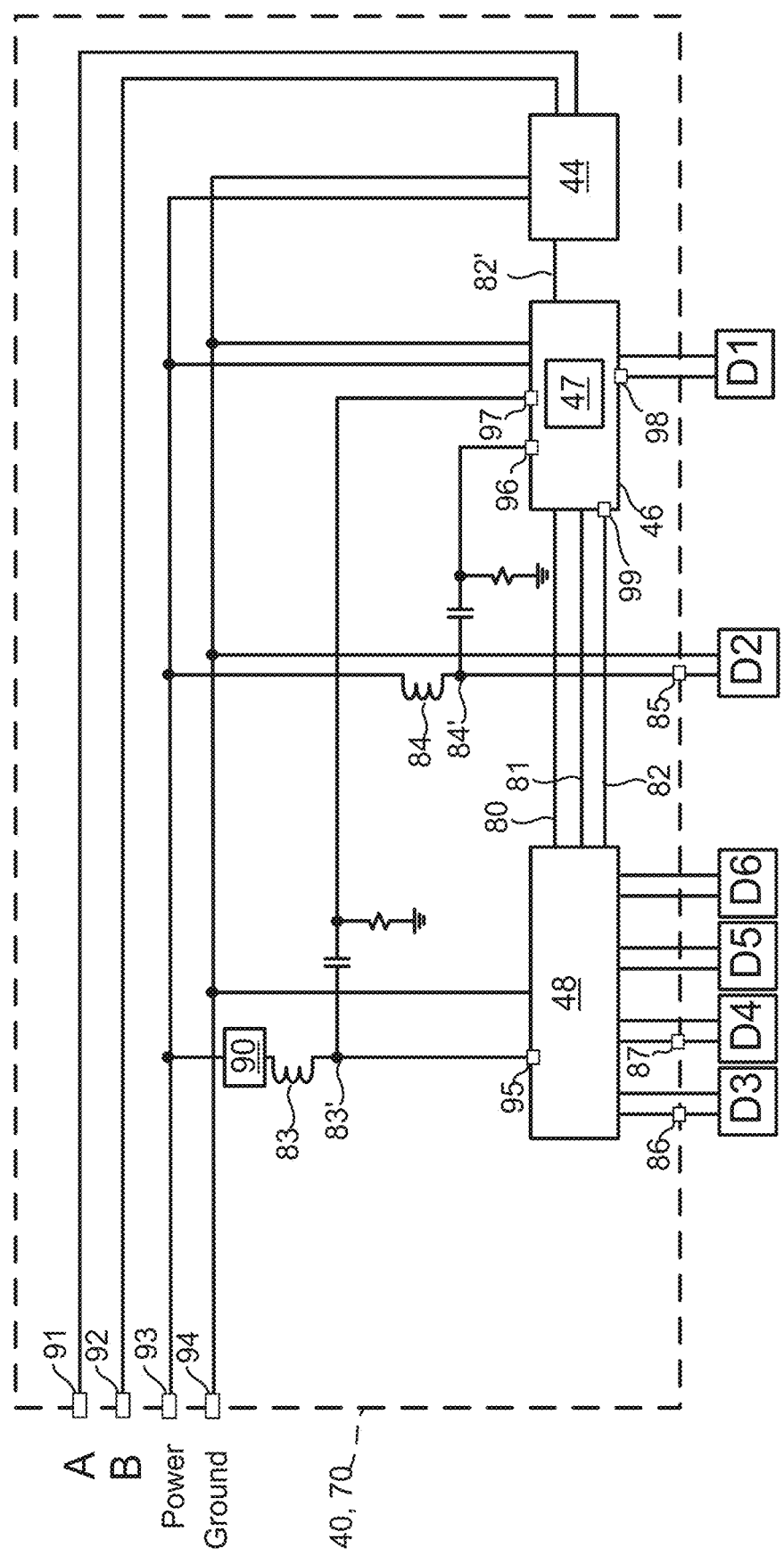
FIGS. 11A and 11B are circuit diagrams of a portion of the embodiment of the IS hub depicted in FIGS. 4, 5, and 8.
Figure 11B:
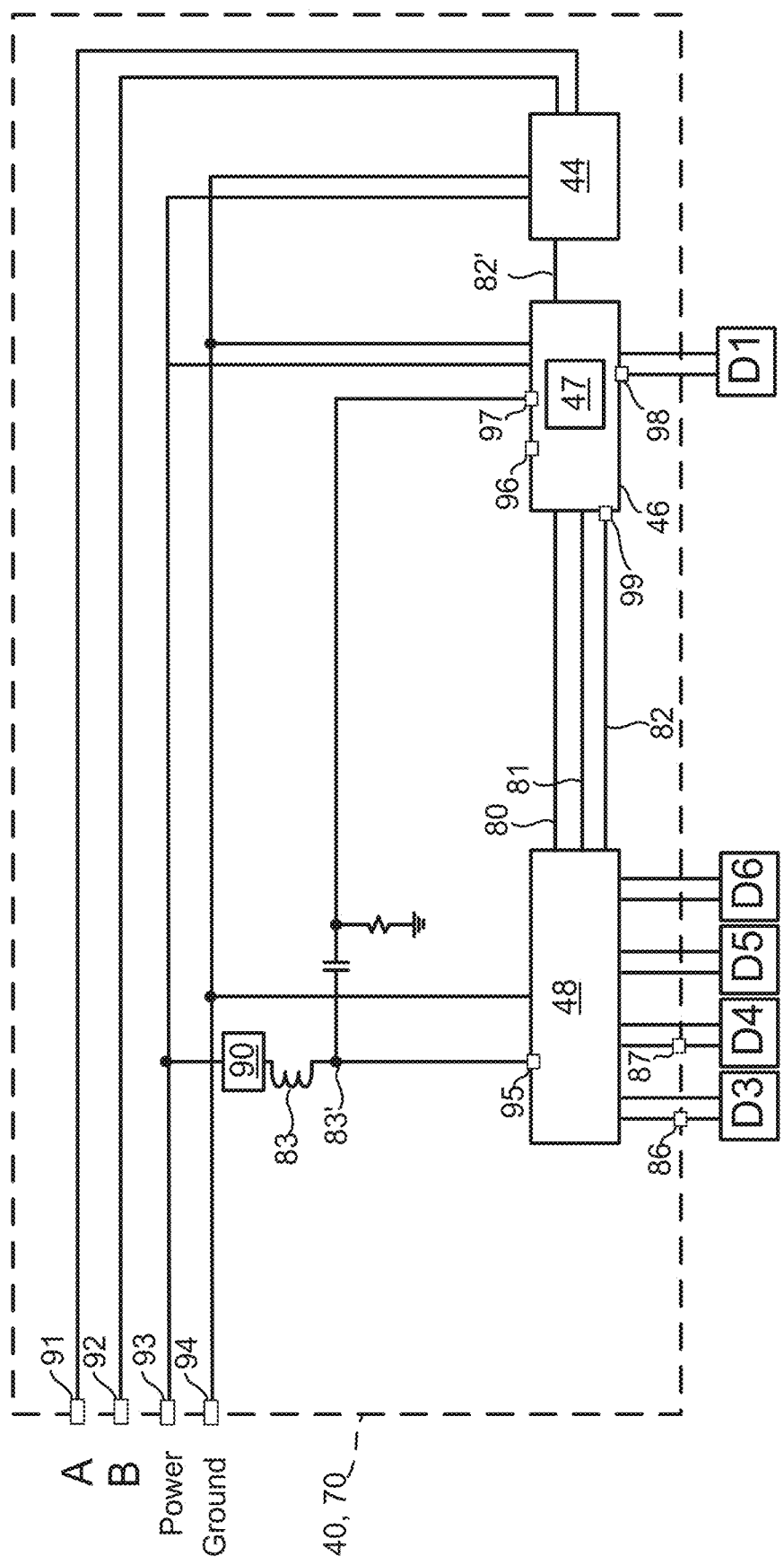

Referring now to FIG. 11A, one variation of the embodiments of the IS hub described above will be described to illustrate the operation of the multiplexer. As shown, controller 46 has one input dedicated for an IS device D1 that does not require provision of power, e.g. a thermocouple, one input for an IS device D2 which is always powered, and one input connected to sample the output of multiplexer 48. Four IS devices D3-D6 are connected to the multiplexer. A first IS device is connected via a contact 86 and a second IS device is connected via a contact 87. Lines 80 and 81 are selectively powered (e.g. binary commands 00, 01, 10, 11) by controller 46 (e.g. multiplexing logic 47) to cause multiplexer 48 to activate one of the four IS devices. A line 82 communicates the data/signal obtained from the IS device to controller 48 via signal input contact 99 and a line 82' communicates the data/signal and address information of the IS device generating the sampled values to communication port 44 so that communication port 44 can output the data and address information over lines A and B. In the present example the input signals are superimposed on the power line and pass through multiplexer 48, therefore the input signals are sampled via inductor 83 and node 83' by controller 46. In the present example the input signal from the dedicated IS device D1 is sampled via inductor 84 and node 84' by controller 46. Node 84' is a connection between inductor 84 and a power contact 85 to which IS device D2 is connected when the IS hub is in use. In the present context dedicated means that the IS devices is not connected to the multiplexer. Accordingly, IS devices D1 and D2 are dedicated. IS hub 70 (and also IS hub 40) has an optional current limiter 90 (discussed below with reference to FIGS. 17 and 18) and four contacts operable to connect external power and a communication cable, denoted by numerals 91-94. Multiplexer 48 has a contact 95 operable to receive power and pass-through a signal from an IS device. Controller 46 has input contacts 96-98 to receive, directly or via multiplexer 48, signals from IS devices. Signals could, optionally be provided directly via line 82 to communication port 44. Data/signals could, optionally, also be provided to controller 46 by connecting a signal contact of each of devices D1-D6 to a signal input contact of controller 46, in which case multiplexing logic 47 would sample the data directly from the signal input contacts corresponding to the powered IS device through appropriate safety barriers as disclosed herein. FIG. 11B illustrates that a dedicated input for an IS device D1 that does not require provision of power or an input for an IS device D2 which is always powered are optional features.

As indicated above, more dedicated IS devices can be used. The inputs from the dedicated devices are sampled by controller 46. Advantageously, the multiplexer ensures via hardware that only one device is powered at any one time, which is a more reliable assurance than is provided via software.

The controller includes multiplexing sequence logic 47 which when executed by the controller causes the multiplexer to activate one of the IS devices, for example by providing power to the IS device selected by the controller. If the multiplexer has four outputs, two control lines from the controller to the multiplexer suffice to communicate four binary selection codes (e.g. 00, 01, 10, 11). In one example, multiplexing sequence logic 47 proceeds in order, engaging one of its power output contacts at the time to therefore power the IS devise connected to the respective power output contact. While the power output contact is activated, the controller samples signals on a communication line communicatively coupling the power input contact of the multiplexer and the first signal input contact of the controller. Known techniques may be used to ensure the sampled signal is stable before converting the signal to digital data or to filter the sampled signals, for example by creating an envelope of the sample signals from which to draw a data value. Once a data value, in digital data form, is obtained, the multiplexing sequence logic may deactivate the power output contact and activate, or power, another. The activation time may be a predetermined duration or may be responsive to the acquisition of the data value.

The term "logic" as used in this patent application includes software and/or firmware executing on one or more programmable processing devices, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. Logic may comprise processing instructions embedded in non-transitory machine-readable media.

Figure 12:
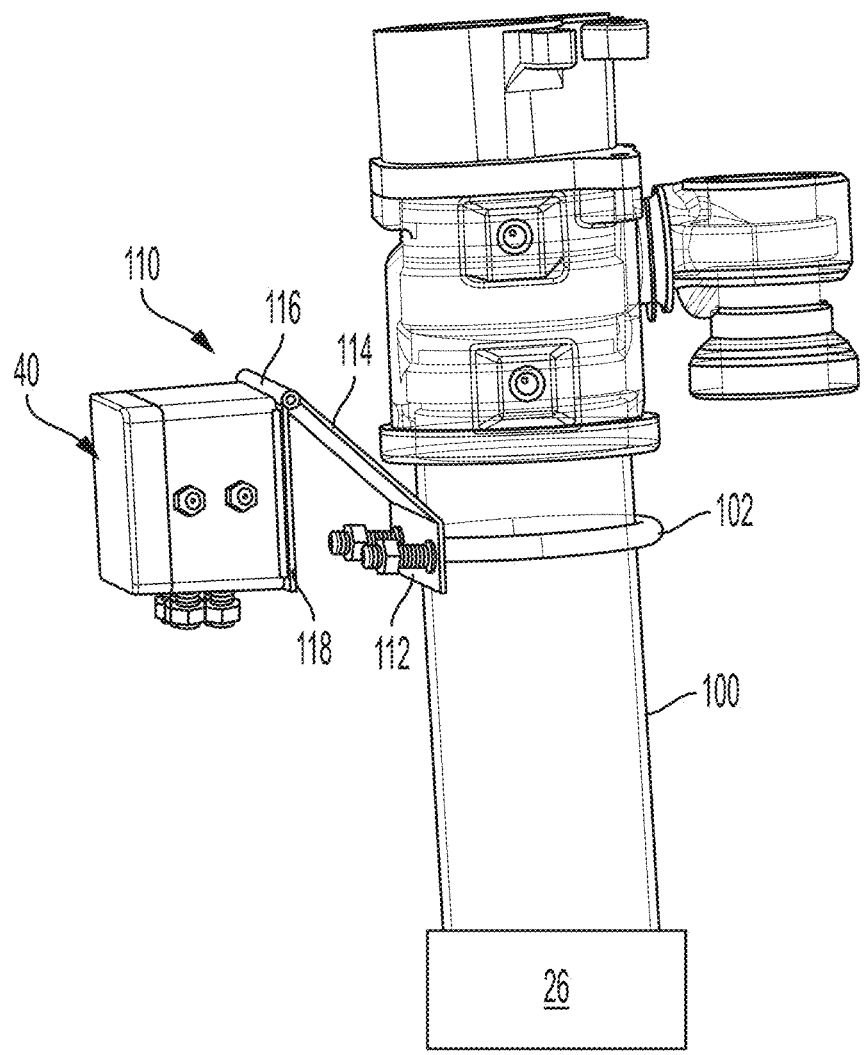
FIGS. 12 and 13 are perspective views of an embodiment of a mounting bracket operable to mount the IS hub on a pipe.
Figure 13:
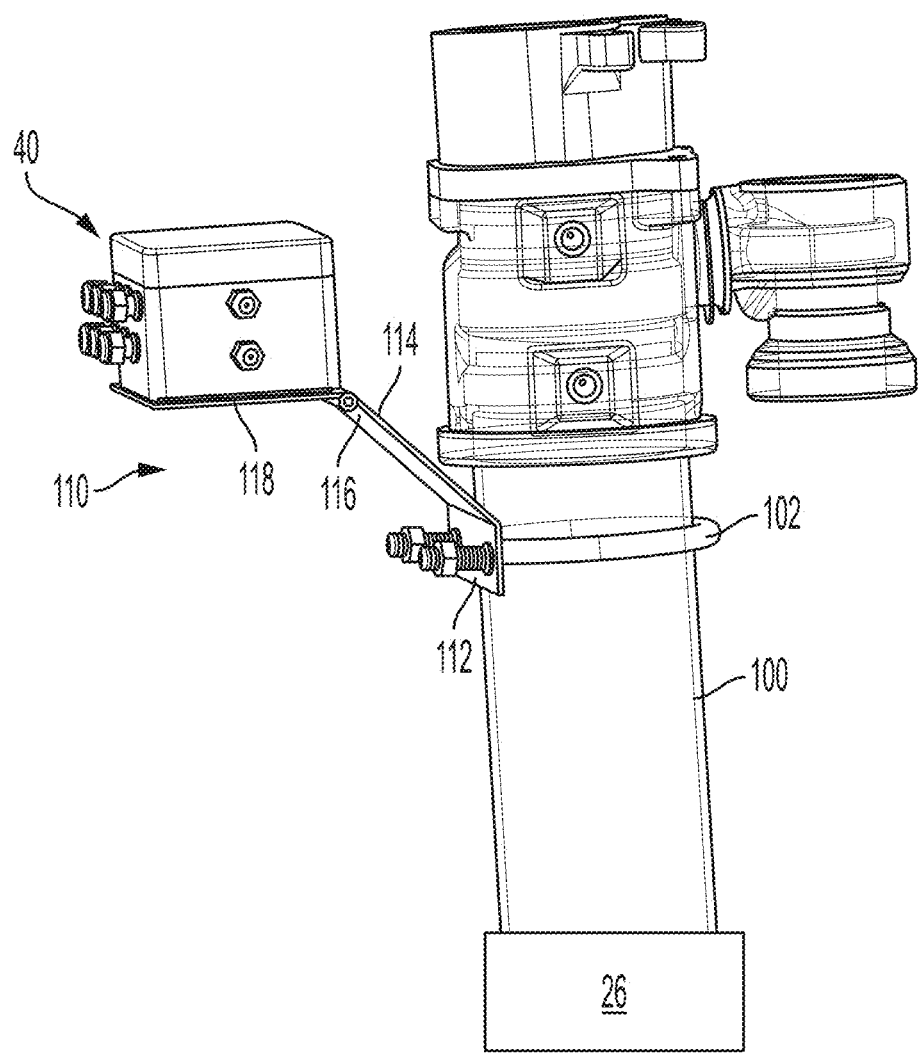
Figure 14:
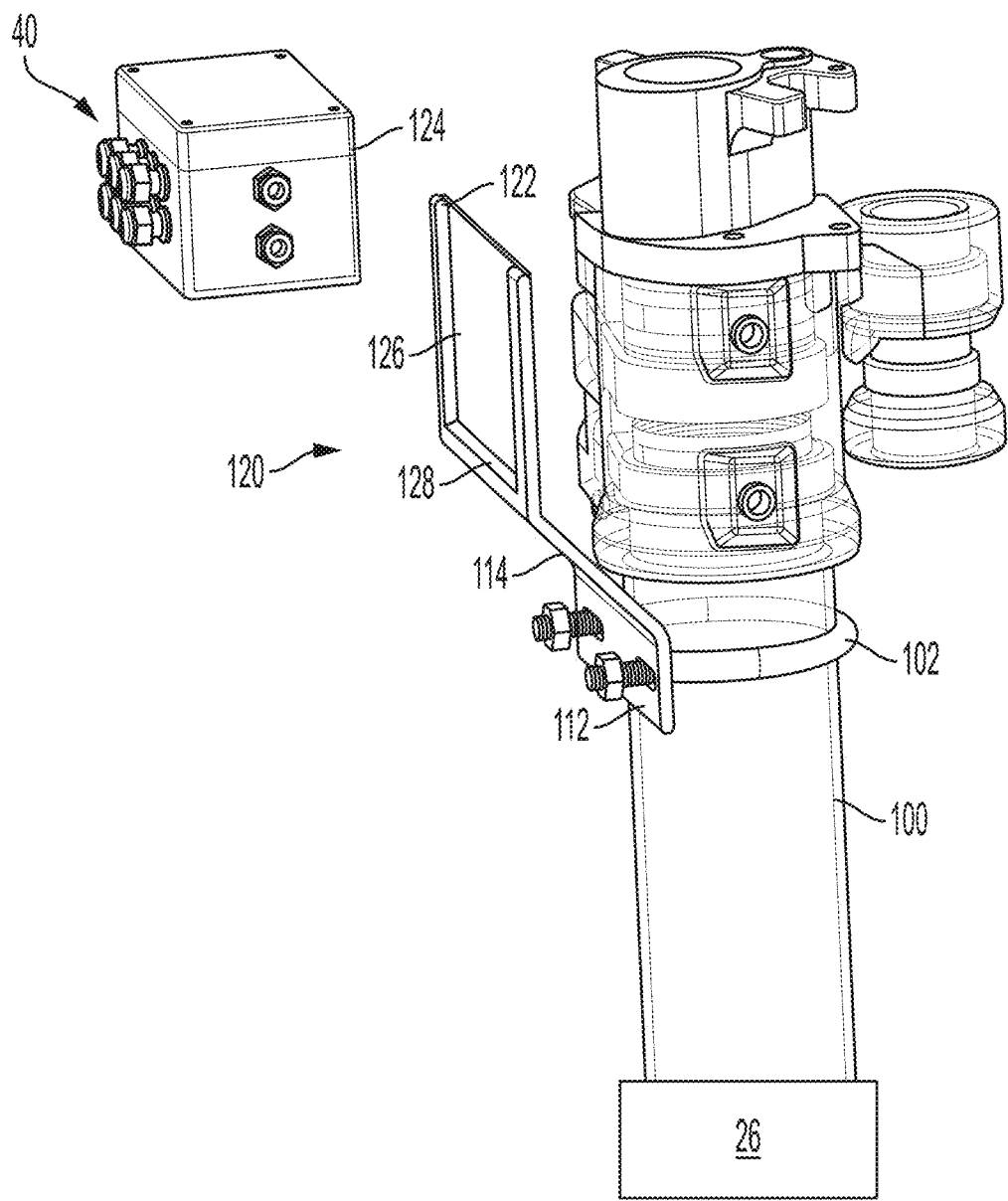
FIG. 14 is a perspective view of another embodiment of a mounting bracket operable to mount the IS hub on a pipe.
Figure 16:
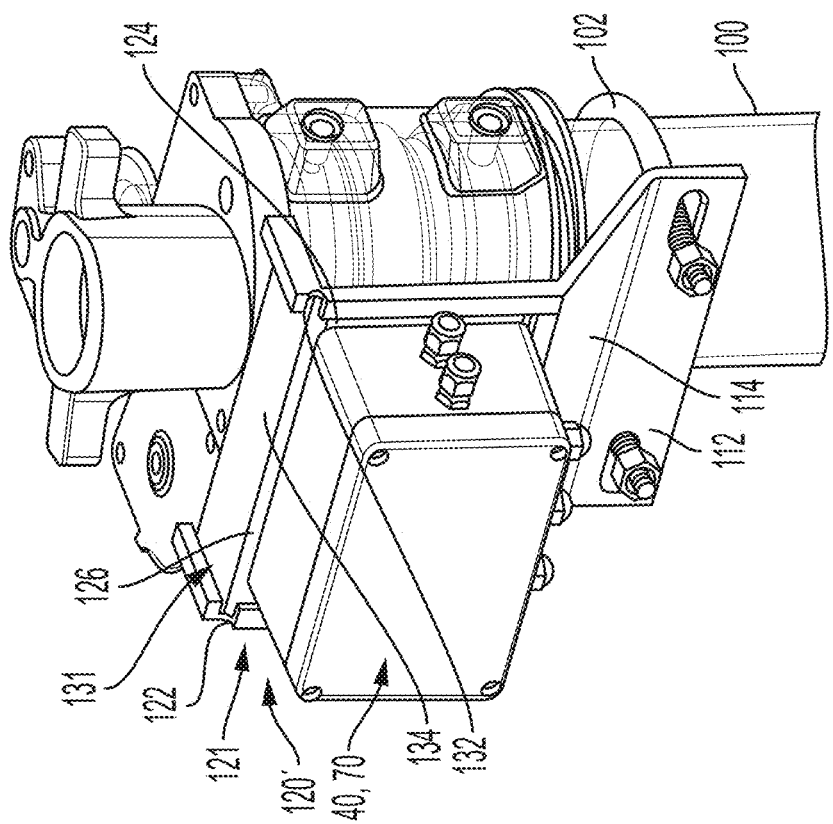
FIGS. 15 and 16 are perspective views of another embodiment of a mounting bracket operable to mount the IS hub on a pipe in a first or a second position.

The IS hub circuits must be enclosed. An example of a housing for the IS hub circuits is shown in FIGS. 6 and 7. In certain embodiments, space is limited and mounting and connecting the housing in small spaces can prove very difficult. Advantageously, the wiring constraints resulting from the limited space can be mitigated by mounting the housing in a flexible manner, as depicted in FIGS. 12 and 13 showing perspective views of a mounting bracket 110 operable to mount the apparatus depicted in FIGS. 4-11B on a pipe 100. A pipe clamp 102 surrounds pipe 100 and penetrates through apertures on a first wall 112 of mounting bracket 102. A second wall 114 extends from first wall 112 at an angle between 30 and 80 degrees. On the end of second wall 114 opposite first wall 112 is a hinge 116 connecting second wall 114 to a mounting plate 118. Hinge 116 allows mounting plate 118 to pivot from a first position, shown in FIG. 12, in which IS multi-drop communication hub 40 hangs vertically, to a second position, shown in FIG. 13, in which IS multi-drop communication hub 40 is in a horizontal position. The hinged mounting plate allows an installer to put which IS multi-drop communication hub 40 in the second position to provide access to the terminal connections through an opening in the body of the IS hub and then to let IS multi-drop communication hub 40 hang, in which case the opening faces a wall of an enclosure constraining access. This is beneficial in situations where space is limited, for example in sump pumps, particularly considering the protrusion of cables from the housing. Of course the mounting bracket does not have to be attached to a pipe, such mounting with a pipe clamp is depicted to illustrate one way to support the bracket. The bracket can also be attached to any support structure within the enclosed space.

In another embodiment of mounting bracket 120, the mounting bracket is operable to removably mount the IS hub on pipe 100 using pipe clamp 102 or any other means to connect pipe 100 or any other support structure in the limited space to bracket 120. Bracket 102 includes first wall 112, second wall 114 extending from first wall 112 at an angle between 30 and 80 degrees, and a pair of slots 122. A third wall 126 may be provided to support slots 122. IS hub housing 60 of IS hub 40, 70 has a pair of parallel longitudinal rails 124, e.g. elongate plate walls protruding from the sides of the body of the IS hub, sized and shaped to slide in slots 122. A protrusion 128, shown as a bottom wall, may be provided to stop downward movement of hub 60 as it slides in the slots. Thus, IS hub 40, 70 can be slid into mounting bracket 120 and can also be slid out for the purpose of making cable connections accessible. The slots can form part of supporting wall 126, as shown, extending from second wall 114. In a variation of the present embodiment, the IS hub includes the slots and the rails are provided by the edges of supporting wall 126.

Figure 15:
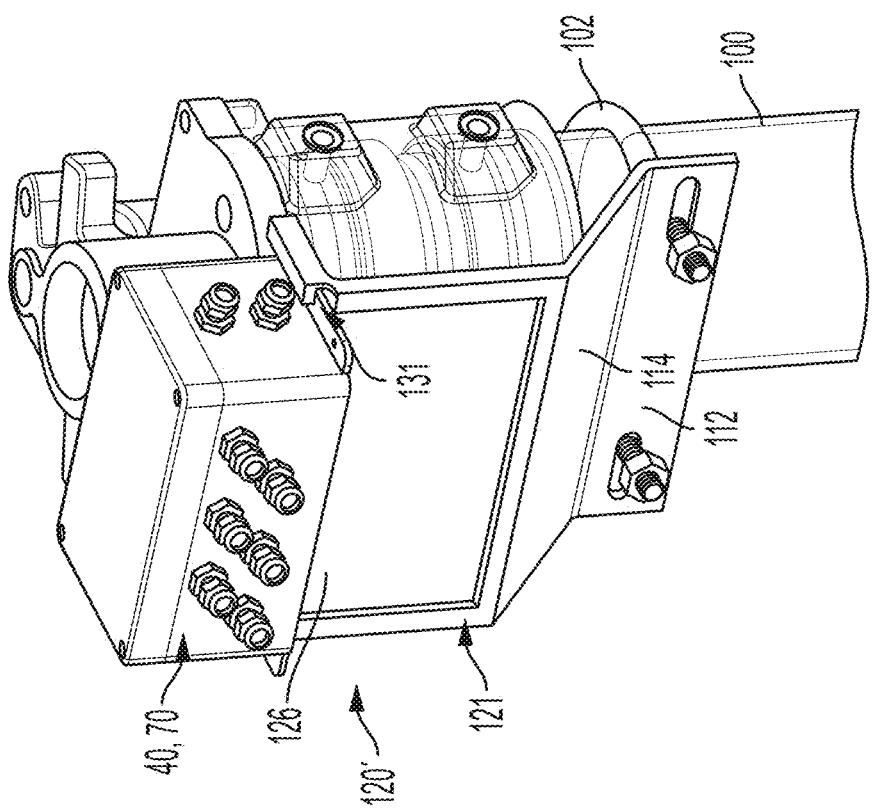
Figure 20:
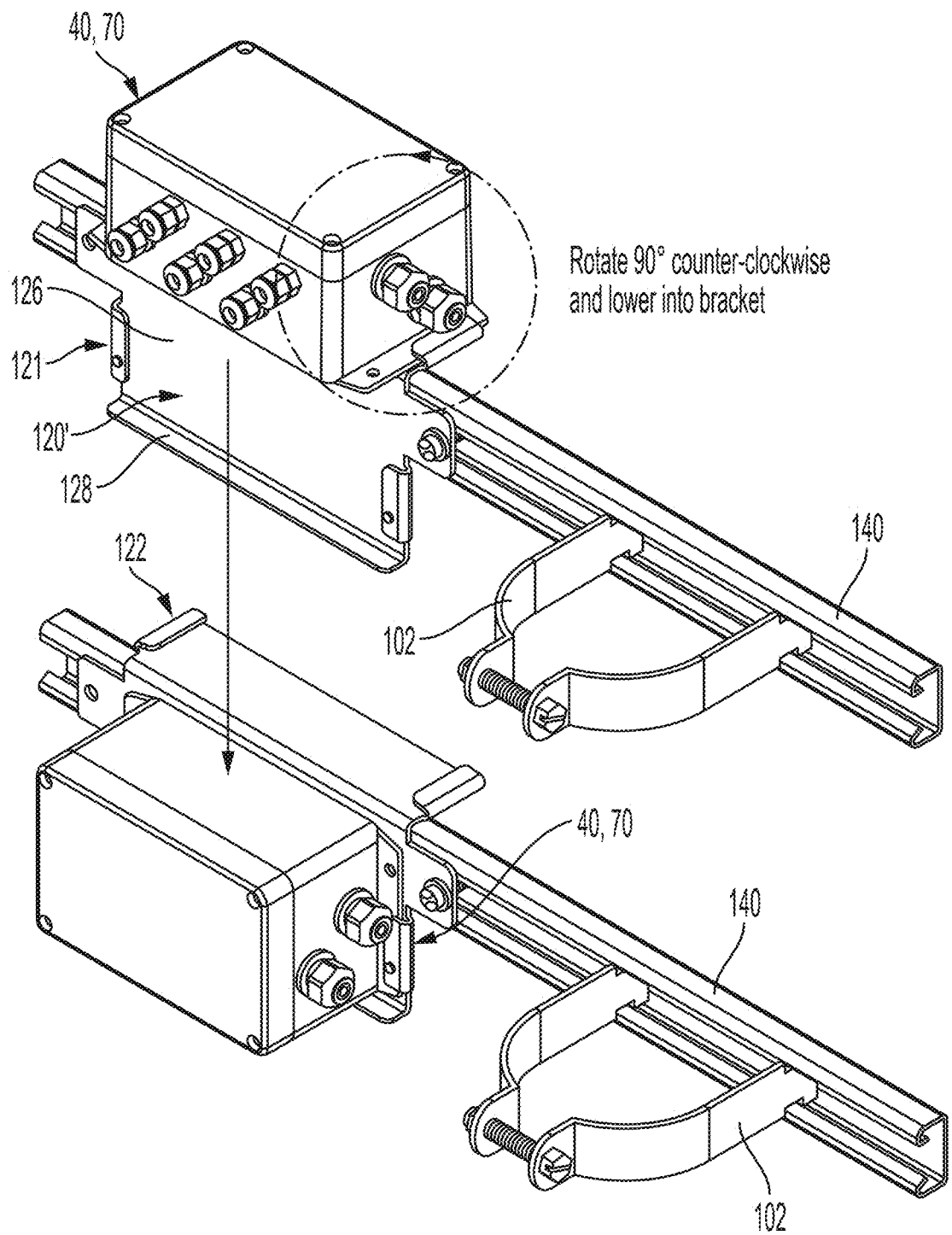

In another embodiment of mounting bracket 120, denoted as bracket 120', the mounting bracket is operable to removably mount the IS hub in a first position or a second position. As shown in FIG. 15, mounting bracket 120' includes first mounting features 121 and second mounting features 131. Second mounting features 131 include opposing slots 132 separated by a bracket surface 134. IS hub 40, 70 include corresponding mounting features, e.g. rails 124. Thus, IS hub 40, 70 can be slid into first mounting features 121 in the first position and into second mounting features 131 in the second position. As shown, the first position is vertical and the second position is horizonal. The second position can be any position different from the first position that is suitable to access the interior of the IS hub more easily than in the first position. In a variation of the present embodiment, shown in FIGS. 19 and 20, mounting bracket 120' includes first mounting features 121, second mounting features 131, and protrusion 128. Wall 126 includes mounting holes to couple mounting bracket 120' to a U-channel that is supported by pipe clamp 102 to pipe 100. Use of U-channels is commonly known and facilitates moving housing 60 a desired distance and orientation from pipe 100, which distance and orientation is determined by the placement of other components in space 20.

Figure 17:
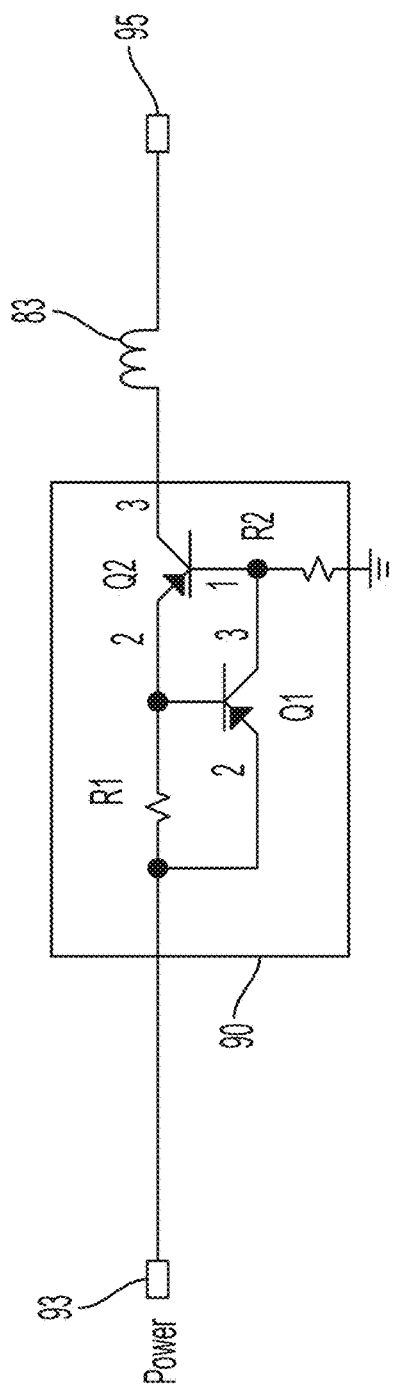
FIGS. 17 and 18 are circuit diagrams of embodiments of current limiters operable in any one of the apparatus depicted in FIGS. 4, 5, 8 and 11.

Additionally, it may be desirable to limit the current flowing through the cable providing power to the IS hub by including a circuit to limit current, e.g. a current limiting circuit. An example current limiting circuit 90 is shown in FIG. 17. R2 allows Q2 to turn on and pass voltage and current to the load. When the current through R1 exceeds the design limit, Q1 begins to turn on, which in turn begins to turn off Q2, thus limiting the load current. Current limiters based on the type of transistor or switch used in the current limiter are known.

A current limiting circuit may be connected on the input side of the IS hub or, as shown, between the input side and each power drop, e.g. in series with each sensing inductor.

Figure 18:
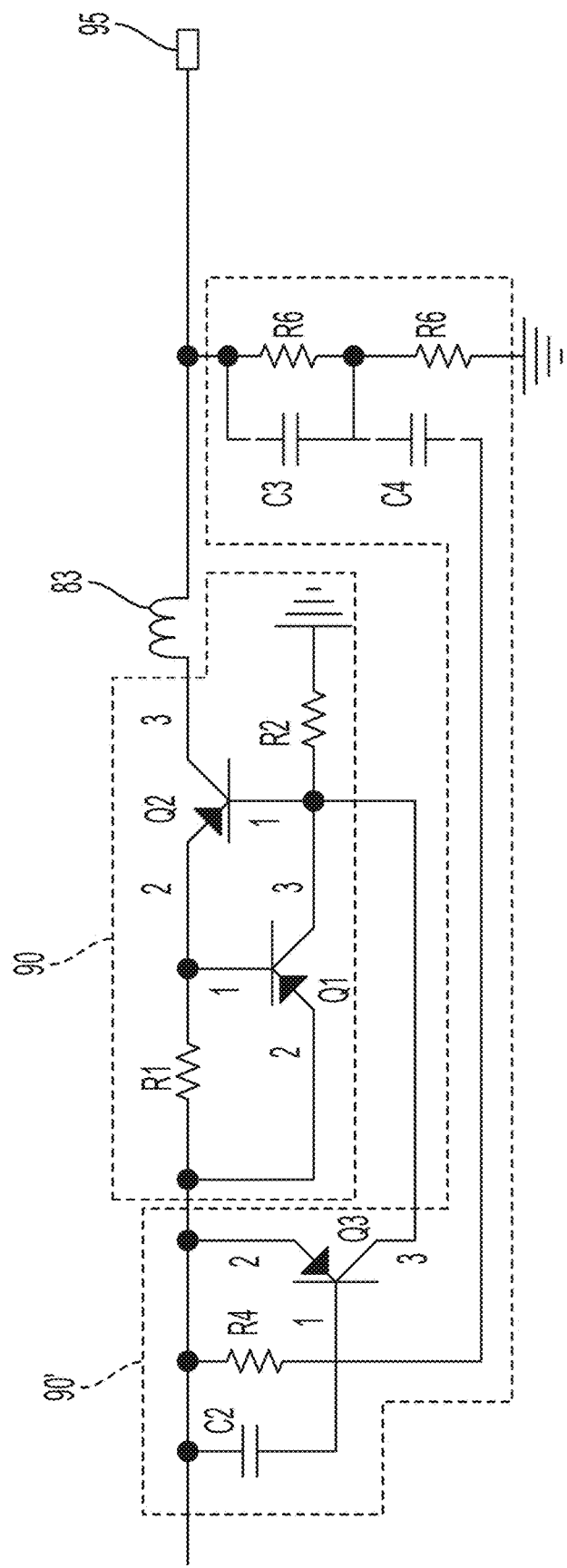

A variation of the current limiting circuit shown in FIG. 17 is shown in FIG. 18 and includes the components of current limiting circuit 90 and, additionally, an inductance reducing circuit 90' structured to enable reduction of the inductance of inductor 83. As shown, inductance reducing circuit 90' is in parallel with inductor 83. Reducing the size of inductors is beneficial for cost and space reasons. Inductance reducing circuit 90' includes an RC filter connected between the power line and R1 and including a capacitor C2 and a resistor R4. The output of the RC filter is connected to the base of a transistor Q3 which has an output connected to the base of transistor Q2. The output of the RC filter is also connected to a frequency compensated voltage divider comprising an RC circuit including a resistor R6 and a capacitor C4, connected to the output of inductor 83 and to a capacitor C4 connected to the base of Q3. A resistor R6 completes the circuit connecting the RC circuit to ground.

Further examples in accordance with the description hereinabove provided include:

Item 1. An intrinsically safe (IS) multi-drop communication hub (IS hub) operable in a hazardous environment, the IS hub comprising:
  a power contact to receive external power therethrough;
  a controller including multiplexing sequence logic and a first signal input contact;
  a multiplexer communicatively connected to the controller and having a power input contact;
  an inductor connected in series between the power contact and the power input contact of the multiplexer;
  a communication port communicatively connected to the controller to receive signal data therefrom, the signal data corresponding to signals generated by IS devices connected to the IS hub when the IS hub is in use,
  wherein when executed by the controller the multiplexing sequence logic causes the multiplexer to supply power in a predetermined sequence to a first of the IS devices during a first time interval and, after the first time interval, to a second of the IS devices during a second time interval which does not overlap in time with the first time interval, and
  wherein during the first time interval the controller samples a signal corresponding to the first of the IS devices and during the second time interval the controller samples a signal corresponding to the second of the IS devices.

Item 2. The IS hub of item 1, wherein the connection between the inductor and the power input contact defines a signal node, and wherein the signal corresponding to the first of the IS devices and the signal corresponding to the second of the IS devices are sampled at the signal node.

Item 3. The IS hub of item 2, wherein the controller includes a second signal input contact, and wherein the IS hub further comprises a dedicated sensor power contact, a second inductor connected between the power contact and the dedicated sensor power contact without the multiplexer therebetween, and a second communication line communicatively coupling the dedicated sensor power contact and the second signal input contact.

Item 4. The IS hub of item 1, further comprising a safety barrier connected between the power contact and a ground contact.

Item 5. The IS hub of item 1, further comprising a safety barrier connected between an output contact of the multiplexer and an IS device contact operable to provide power to the first of the IS devices.

Item 6. The IS hub of item 5, further comprising a safety barrier connected between an output contact of the multiplexer and an IS device contact operable to provide power to the first of the IS devices.

Item 7. The IS hub of item 6, further comprising a safety barrier connected between the power contact and a ground contact.

Item 8. The IS hub of item 7, wherein the controller includes a second signal input contact, and wherein the IS hub further comprises a dedicated sensor power contact, a second inductor connected between the power contact and the dedicated sensor power contact without the multiplexer therebetween, and a second communication line communicatively coupling the dedicated sensor power contact and the second signal input contact.

Item 9. The IS hub of item 1, wherein the controller includes a second signal input contact, and wherein the IS hub further comprises a dedicated sensor power contact, a second inductor connected between the power contact and the dedicated sensor power contact without the multiplexer therebetween, and a second communication line communicatively coupling the dedicated sensor power contact and the second signal input contact.

Item 10. The IS hub of item 1, wherein the communication port comprises a serial communication port.

Item 11. The IS hub of item 10, wherein the serial communication port is an RS-485 communication port.

Item 12. The IS hub of item 10, further comprising a current limiting circuit in series with the first inductor.

Item 13. The IS hub of item 12, further comprising an inductance reducing circuit in parallel with the first inductor.

Item 14. The IS hub of any of the preceding items, wherein the IS hub comprises a housing having a body and a cover covering an access opening of the body, further comprising a mounting bracket operable to move the IS hub from a first position to a second position different from the first position.

Item 15. The IS hub of item 14, wherein in the second position the access opening faces upward to facilitate installation and and in the first position the access opening does not face upward.

Item 16. The IS hub of item 15, wherein the IS hub is sized and shaped for installation in an enclosable space and in the first position the access opening faces a lateral wall of the enclosable space.

Item 17. The IS hub of any one of items 14-16, wherein the mounting bracket has a hinge operable to move the IS hub from the first position to the second position.

Item 18. The IS hub of any one of items 14-16, wherein one of the mounting bracket or the body comprises a pair of opposing slots and the other of the mounting bracket or the body comprises a pair of opposing rails sized and shaped to slide in the pair of opposing slots to removably mount the IS hub to the mounting bracket.

Item 19. The IS hub of any one of items 14-16, wherein the mounting bracket has first and second mounting features and the IS hub has mounting features operable with the first and second mounting features of the bracket, wherein the IS hub can be mounted in the first position with the first mounting features and the second position with the second mounting features.

Item 20. The IS hub of item 19, wherein first or second mounting features comprise rails sized and shaped to slide within corresponding slots of the other of the first or second mounting features.

Item 21. A method of determining values of signals generated by intrinsically safe (IS) devices in a hazardous environment, the method performed by a controller executing processing instructions structed to perform the method, the method comprising, in sequence:

transmitting a command to a multiplexer to supply power to a first of the IS devices during a first time interval;

sampling a signal corresponding to the first of the IS devices;

transmitting a command to the multiplexer to supply power to a second of the IS devices during a second time interval which does not overlap in time with the first time interval; and sampling a signal corresponding to the second of the IS devices;

Item 22. The method of item 21, further comprising sampling a signal corresponding to a dedicated of the IS devices.

Item 23. The method of item 22, wherein sampling the signal corresponding to the dedicated of the IS devices is performed during the first time interval or during the second time interval.

Described above are several embodiments, variations, and examples of an IS multi-drop hub, or IS hub, including safety circuits positioned in serial therewith and included therein. Also described are a housing and a mounting bracket particularly suitable for applications in which mounting spaces are limited. However, the scope of the disclosure is to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. An intrinsically safe (IS) multi-drop communication hub (IS hub) operable in a hazardous environment, the IS hub comprising:

a power contact to receive external power therethrough;

a controller including multiplexing sequence logic;

a multiplexer communicatively connected to the controller and having a power input contact;

an inductor connected in series between the power contact and the power input contact of the multiplexer; and a communication port to transmit signal data provided by the multiplexer corresponding to signals generated by IS devices connected to the IS hub when the IS hub is in use, wherein when executed by the controller the multiplexing sequence logic causes the multiplexer to supply power in a predetermined sequence to a first of the IS devices during a first time interval to generate a signal from the first of the IS devices and, after the first time interval, to a second of the IS devices during a second time interval, which does not overlap in time with the first time interval, to generate a signal from the second of the IS devices.

2. The IS hub of claim 1, wherein the connection between the inductor and the power input contact defines a node, and wherein the signal corresponding to the first of the IS devices and the signal corresponding to the second of the IS devices are sampled by the controller at the node.

3. The IS hub of claim 2, wherein the controller includes a first signal input contact to sample the signals at the node, a second signal input contact and wherein the IS hub further comprises a dedicated sensor power contact, a second inductor connected between the power contact and the dedicated sensor power contact without the multiplexer therebetween, and a second communication line communicatively coupling the dedicated sensor power contact and the second signal input contact.

4. The IS hub of claim 1, further comprising a safety barrier connected between the power contact and a ground contact.

5. The IS hub of claim 4, further comprising a safety barrier connected between an output contact of the multiplexer and an IS device contact operable to provide power to the first of the IS devices.

6. The IS hub of claim 1, further comprising a safety barrier connected between an output contact of the multiplexer and an IS device contact operable to provide power to the first of the IS devices.

7. The IS hub of claim 6, further comprising a safety barrier connected between the power contact and a ground contact.

8. The IS hub of claim 7, wherein the controller includes a second signal input contact, and wherein the IS hub further comprises a dedicated sensor power contact, a second inductor connected between the power contact and the dedicated sensor power contact without the multiplexer therebetween, and a second communication line communicatively coupling the dedicated sensor power contact and the second signal input contact.

9. The IS hub of claim 1, wherein the controller includes a second signal input contact, and wherein the IS hub further comprises a dedicated sensor power contact, a second inductor connected between the power contact and the dedicated sensor power contact without the multiplexer therebetween, and a second communication line communicatively coupling the dedicated sensor power contact and the second signal input contact.

10. The IS hub of claim 1, wherein the communication port comprises a serial communication port.

11. The IS hub of claim 10, wherein the serial communication port is an RS-485 communication port.

12. The IS hub of claim 1, further comprising a current limiting circuit (90) in series with the first inductor.

13. The IS hub of claim 12, further comprising an inductance reducing circuit in parallel with the first inductor.

14. The IS hub of claim 1, wherein the IS hub comprises a housing having a body and a cover covering an access opening of the body, further comprising a mounting bracket operable to position the IS hub in a first position or a second position different from the first position.

15. The IS hub of claim 14, wherein in the second position the access opening faces upward to facilitate installation and in the first position the access opening does not face upward.

16. The IS hub of claim 15, wherein the IS hub is sized and shaped for installation in an enclosable space and in the first position the access opening faces a lateral wall of the enclosable space.

17. The IS hub of claim 14, further comprising a current limiting circuit in series with the first inductor.

18. The IS hub of claim 17, further comprising an inductance reducing circuit in parallel with the first inductor.

19. The IS hub of claim 14, wherein the mounting bracket has a hinge operable to move the IS hub from the first position to the second position.

20. The IS hub of claim 14, wherein one of the mounting bracket or the body comprises a pair of opposing slots and the other of the mounting bracket or the body comprises a pair of opposing rails sized and shaped to slide in the pair of opposing slots to removably mount the IS hub to the mounting bracket.

21. The IS hub of claim 20, wherein the mounting bracket comprises a second pair of opposing slots or a second pair of opposing rails sized and shaped to receive the pair of opposing slots or opposing rails of the body.

22. The IS hub of claim 14, wherein the mounting bracket has first and second mounting features and the IS hub has mounting features operable with the first and second mounting features of the bracket, wherein the IS hub can be mounted in the first position with the first mounting features and the second position with the second mounting features.

23. The IS hub of claim 22, wherein first or second mounting features comprise rails sized and shaped to slide within corresponding slots of the other of the first or second mounting features.

24. A method of determining values of signals generated by intrinsically safe (IS) devices in a hazardous environment, the method comprising, in sequence:

transmitting a command to a multiplexer to supply power to a first of the IS devices during a first time interval;

sampling a signal corresponding to the first of the IS devices;

transmitting a command to the multiplexer to supply power to a second of the IS devices during a second time interval which does not overlap in time with the first time interval; and sampling a signal corresponding to the second of the IS devices;

wherein sampling the signals corresponding to the first of the IS devices and the second of the IS devices is performed at a node between a power contact of the IS hub and a power input contact of the multiplexer.

25. The method of claim 24, further comprising sampling a signal corresponding to at least one dedicated IS device.

26. The method of claim 25, wherein sampling the signal corresponding to at least one dedicated IS device is performed during the first time interval or during the second time interval.

27. The method of claim 24, further comprising allowing current to flow through the node responsive to the command to the multiplexer to supply power to the first of the IS devices or to the second of the IS devices.

28. The method of claim 24, further comprising removably mounting the IS hub on a bracket in a first position, placing a cover of the IS hub over an opening in a body of the IS hub, securing the cover onto the body, and subsequently to securing the cover, moving the IS hub and mounting the IS hub on the bracket in a second position different than the first position.

29. The method of claim 28, wherein the mounting bracket has first and second mounting features and the IS hub has mounting features operable with the first and second mounting features of the bracket, wherein the IS hub can be mounted in the first position with the first mounting features and the second position with the second mounting features.

* * * * *